US010090912B2

(12) United States Patent
Moon et al.

(10) Patent No.: US 10,090,912 B2
(45) Date of Patent: Oct. 2, 2018

(54) ANTENNA SYSTEM OF MOBILE COMMUNICATION BASE STATION

(71) Applicant: KMW INC., Hwaseong, Gyeonggi-Do (KR)

(72) Inventors: Young-Chan Moon, Gyeonggi-Do (KR); Sung-Hwan So, Gyeonggi-Do (KR); Jong-Han Kim, Seoul (KR); Goog-Seong Jeong, Gyeonggi-Do (KR); Dong-Hun Lee, Gyeonggi-Do (KR); Ki-Hoon Woo, Gyeonggi-Do (KR)

(73) Assignee: KMW INC., Hwaseong, Gyeonggi-do (KR)

(*) Notice: Subject to any disclaimer, the term of this patent is extended or adjusted under 35 U.S.C. 154(b) by 136 days.

(21) Appl. No.: 14/297,021

(22) Filed: Jun. 5, 2014

(65) Prior Publication Data
US 2014/0287696 A1 Sep. 25, 2014

Related U.S. Application Data

(63) Continuation of application No. PCT/KR2013/000565, filed on Jan. 24, 2013.

(30) Foreign Application Priority Data

Jan. 27, 2012 (KR) .................. 10-2012-0008317
Dec. 21, 2012 (KR) .................. 10-2012-0150492

(51) Int. Cl.
*H04B 7/26* (2006.01)
*H01Q 1/24* (2006.01)
(Continued)

(52) U.S. Cl.
CPC ............... *H04B 7/26* (2013.01); *H01Q 1/246* (2013.01); *H01Q 3/00* (2013.01); *H01Q 3/01* (2013.01); *H01Q 3/36* (2013.01)

(58) Field of Classification Search
None
See application file for complete search history.

(56) References Cited

U.S. PATENT DOCUMENTS 7,177,667 B2    2/2007  Kim
2005/0113047 A1  5/2005  Kim
(Continued)

FOREIGN PATENT DOCUMENTS

CN    101057368 A    10/2007
CN    101626231 A    1/2010
(Continued)

OTHER PUBLICATIONS

Lee et al, Design and Implementation of AISG Modem, IEEE, 2011.*

(Continued)

*Primary Examiner* — James Yang
*Assistant Examiner* — Jianxun Yang
(74) *Attorney, Agent, or Firm* — Mintz Levin Cohn Ferris Glovsky and Popeo, P.C.; Kongsik Kim

(57) ABSTRACT

The present invention is an antenna system of a mobile communication base station, comprising: a signal separation unit which is arranged within a radome of an antenna, and which separates a synthetic signal of a wireless signal transmitted from a main system of a base station through a feeder cable, a direct current power signal and a control signal having a preset format for controlling the antenna, in such a manner that the direct current power signal and the control signal are output by being separated from the wireless signal and the wireless signal is provided to an antenna unit; and equipment to be remotely controlled having a modem for receiving the direct current power signal and the control signal output from the signal separation unit and using the direct current power signal as an operating power (Continued)

and converting the control signal into a format which is preset to be internally recognizable in the radome of the antenna, the equipment to be remotely controlled performing an antenna control operation according to a control signal.

3 Claims, 3 Drawing Sheets

(51) Int. Cl.
    *H01Q 3/36*     (2006.01)
    *H01Q 3/00*     (2006.01)
    *H01Q 3/01*     (2006.01)

(56) References Cited

U.S. PATENT DOCUMENTS

| | | | |
|---|---|---|---|
| 2006/0229048 A1* | 10/2006 | Carroll | H01Q 1/246 455/268 |
| 2006/0244675 A1 | 11/2006 | Elliot et al. | |
| 2007/0161348 A1* | 7/2007 | Gribben | H04W 88/08 455/13.3 |
| 2007/0290935 A1 | 12/2007 | Franzon et al. | |
| 2010/0201591 A1* | 8/2010 | Girard | H01Q 1/246 343/766 |

FOREIGN PATENT DOCUMENTS

| | | |
|---|---|---|
| CN | 101740864 A | 6/2010 |
| CN | 201732859 U | 2/2011 |
| EP | 1 487 223 A1 | 12/2004 |
| EP | 1 653 636 A2 | 5/2006 |
| WO | WO-2005-048401 A1 | 5/2005 |
| WO | WO-2008/033076 A1 | 3/2008 |

OTHER PUBLICATIONS

RFS, AISG 2.0 bias-T with surge protection, 2007 http://www.rfsworld.com/userfiles/pdf/bita2s-3a120_datasheet_revb.pdf.*
Kathrein, 700 MHz single band antenna RET, 2011 http://www.kathrein-scala.com/catalog/80010734V01.pdf.*
AISG integrated transceiver, Maxim, 2011 http://datasheets.maximintegrated.com/en/ds/MAX9947.pdf.*
Wideband Bias Tee, Johnson, 2008 http://wb9jps.com/Gary_Johnson/Bias_Tee_files/Bias_Tee_Design_V2R.pdf.*
AISG, AISG v2.0, 2006 http://www.aisgweb.net/Website/IndexDocs/Specifications/AISG%20v2.0%20.pdf.*

* cited by examiner

ANTENNA SYSTEM OF MOBILE COMMUNICATION BASE STATION

CROSS-REFERENCE TO RELATED APPLICATIONS

This application is a continuation of International Application No. PCT/KR2013/000565, filed on Jan. 24, 2013, which claims priority to Korean Application No. 10-2012-0008317, filed on Jan. 27, 2012 and Korean Application No. 10-2012-0150492, filed on Dec. 21, 2012, which applications are incorporated herein by reference.

TECHNICAL FIELD

The present invention relates to an antenna system of a mobile communication base station, and more particularly, to an antenna system in which an operation of an antenna is remotely controlled according to a 3rd Generation Partnership Project (3GPP) or Antenna Interface Standards Group (AISG) protocol.

BACKGROUND ART

A currently widely used antenna system of a mobile communication base station generally has a structure in which a plurality of radiating elements is vertically arranged which can transmit or receive an electric wave using two polarized waves which are perpendicular to each other (generally referred to as an X-shaped polarized wave). A polarized plane of the X-shaped polarized wave is basically arranged to be inclined at an angle of +45 degrees or −45 degrees with respect to the horizontal or vertical plane.

Such an antenna system commonly includes devices for remotely controlling a status of beams radiated from an antenna, for example, a Remote Azimuth Steering (RAS) device for remotely controlling azimuth steering, a Remote Azimuth Beamwidth (RAB) device for remotely controlling a beamwidth of an azimuth, and a Remote Electrical Tilt (RET) device for electronically controlling a down tilt angle. An antenna including such devices is disclosed in Korean Patent Publication No. 10-2010-0122092 first filed by Amphenol Corporation (published on Nov. 19, 2010 and entitled 'Multi-beam Antenna with Multi-device Control Unit'; inventors Gregory Girard and Frank Soulie).

In the above description, for example, controlling the down tilt angle is used to reduce co-channel interference or to cover a region around a base station where a service is not provided. Furthermore, controlling the down tilt angle is used to minimally reduce interference between base station sectors in a region having multiple base stations due to massive telephone traffic in an urban area and to reduce interference between neighboring base stations due to antenna side-lobe. For control of the RET device, the RAS device or the RAB device described above, Antenna Interface Standards Group (AISG) v2.1.0 was recently devised, and a communication method through 3rd Generation Partnership Project (3GPP) protocol was also developed.

FIG. 1 is a block diagram illustrating an example of a main system of a base station and an antenna system for RET control of an antenna in the mobile communication base station according to the related art. According to the 3GPP or AISG standard, the RET control is largely divided into a control by a primary station and a control by a secondary station. Referring to FIG. 1, the mobile communication base station may generally include an antenna system disposed at a high place such as a building or pillar, a main system of the base station disposed on the ground, and a feeder cable connecting the antenna system and the main system, in which the primary station may correspond to the main system of the base station, and the secondary station may correspond to the antenna system.

More specifically, the primary station is a master part such as a Master Control Unit (MCU) 22 which is provided at the main system of the base station to transmit a control signal, and the secondary station is a slave part such as an RET 14 and an Antenna Line Device (ALD) modem 13 which receive the control signal to perform an operation according to the corresponding control signal.

A main body unit 21 of the base station performs basic processing operations for RF signals to be transmitted and received and transmits the RF signals through the feeder cable. The MCU 22 transmits a DC signal corresponding to operating power for driving the RET device 14 and an RS485 communication signal for control. The signals transmitted by the main body unit 21 of the base station and the MCU 22 are converted and synthesized into Direct Current (DC) signal+RF signal+On-Off Keying (OOK) signal by a bottom ALD modem 23 included in the main system of the base station. The synthesized signal is transmitted to the lower end of the antenna through the feeder cable. The top ALD modem 13 included in the antenna system filters DC signal+OOK signal out of the signal transmitted through the feeder cable as described above, and provides DC signal+OOK signal to the RET device 14 to help the RET device 14 receive a command.

At this time, the top ALD modem 13 and the RET device 14 are connected through an AISG cable, and a signal is transmitted through the AISG cable. The top ALD modem 13 and the antenna 10 are connected through a feeder cable, and an RF signal is transmitted through the feeder cable. Furthermore, the top ALD modem 13 provides the RF signal separated from DC signal+OOK signal to a first antenna 11 configured with a plurality of radiating elements for transmission and reception. Meanwhile, the antenna 10 may include a plurality of antennas, for example the first antenna 11 and a second antenna 12, configured with a plurality of transmission and reception radiating elements, and the control signal for controlling the RET device 14 may be provided through a feeder cable of one antenna, for example, the first antenna 11.

Although the RET device 14 has been exemplified as the device for receiving the control signal transmitted from the main system of the base station while being mounted to the antenna 10 and performing the operations according to the corresponding control signal, an RAS device and an RAB device may also be mounted to the antenna 10 to operate in the same manner. Furthermore, when all of the RET device, the RAS device, and the RAB device are mounted to the antenna 10, they may be connected with each other in the daisy chain manner using the AISG cable. At this time, a connection may be made such that DC signal+RS485 signal provided from the external top ALD modem 13 is primarily provided to the RET device.

In the configuration as described above, the RET device 14 is mounted within a radome forming an external appearance of the antenna 10 and is installed to be connected with the outside through an AISG connector. The top ALD modem 13 is additionally disposed as a separate device at the external lower end of the radome of the antenna 10. The top ALD modem 13 is connected with the RET device 14 through the AISG cable, and is connected with a connector, for example, a Deutsch Industrial Norms (DIN) connector formed in a lower cap of the radome of the antenna 10 through a separate feeder cable to thereby be connected with the antenna 10.

Such a configuration as described above additionally requires the separate AISG cable for signal transmission between the top ALD modem 13 and the RET device 14, the separate feeder cable for signal transmission between the top ALD modem 13 and the antenna 10, and the feeder cable having a length of several to tens of meters which is required for signal transmission from the main system of the base station to the antenna system. In addition, since the top ALD modem 13 is mounted as a separate instrument to the outside of the antenna 10, it is recognized as being considerably burdensome in terms of an installation cost, an installation space, and a weight.

SUMMARY

Accordingly, an aspect of the present invention is to provide an antenna system of a mobile communication base station, in which devices and required components for receiving a control signal transmitted from a main system of the base station and performing operations according to the corresponding control signal are simplified, thereby achieving easy installation to reduce costs required for mounting the devices and reducing the required installation space and the weight thereof.

In accordance with one aspect of the present invention, an antenna system of a mobile communication base station includes; a signal separation unit that is provided within a radome of an antenna, receives a synthetic signal of an RF signal, a DC signal, and a control signal with a preset format for antenna control which is transmitted from a main system of the base station through a feeder cable, separates the DC signal and the control signal from the RF signal, and provides the RF signal to an antenna unit; and a remote control target device that is provided within the radome of the antenna, receives the DC signal and the control signal which are output from the signal separation unit, uses the DC signal as operating power, and performs an operation for the antenna control according to the control signal, wherein the remote control target device includes a modem that converts the control signal into a format set in advance to be internally recognized.

The control signal output from the signal separation unit may be an On-Off Keying (OOK) signal format, and the remote control target device may convert the OOK signal format into an RS485 signal and a Transistor-Transistor Logic (TTL) signal.

The remote control target device may include: a power source that provides the DC signal output from the signal separation unit as operating power for each of internal function units; the modem that converts the OOK signal into the TTL signal; a first RS485 circuit that converts the TTL signal output from the modem into the RS485 signal; a second RS485 circuit that converts the RS485 signal output from the first RS485 circuit into the TTL signal again; and a Central Processing Unit (CPU) that receives the TTL signal output from the second RS485 circuit to recognize a control command, and outputs an operating control signal to a driver that drives an electrical and mechanical device set in advance for the antenna control.

As described above, the present invention provides an antenna system of a mobile communication base station in which devices and required components for receiving a control signal transmitted from a main system of the base station and performing operations according to the corresponding control signal are simplified, thereby achieving easy installation to reduce costs required for mounting the devices and reducing the required installation space and the weight thereof.

DETAILED DESCRIPTION

Figure 1:
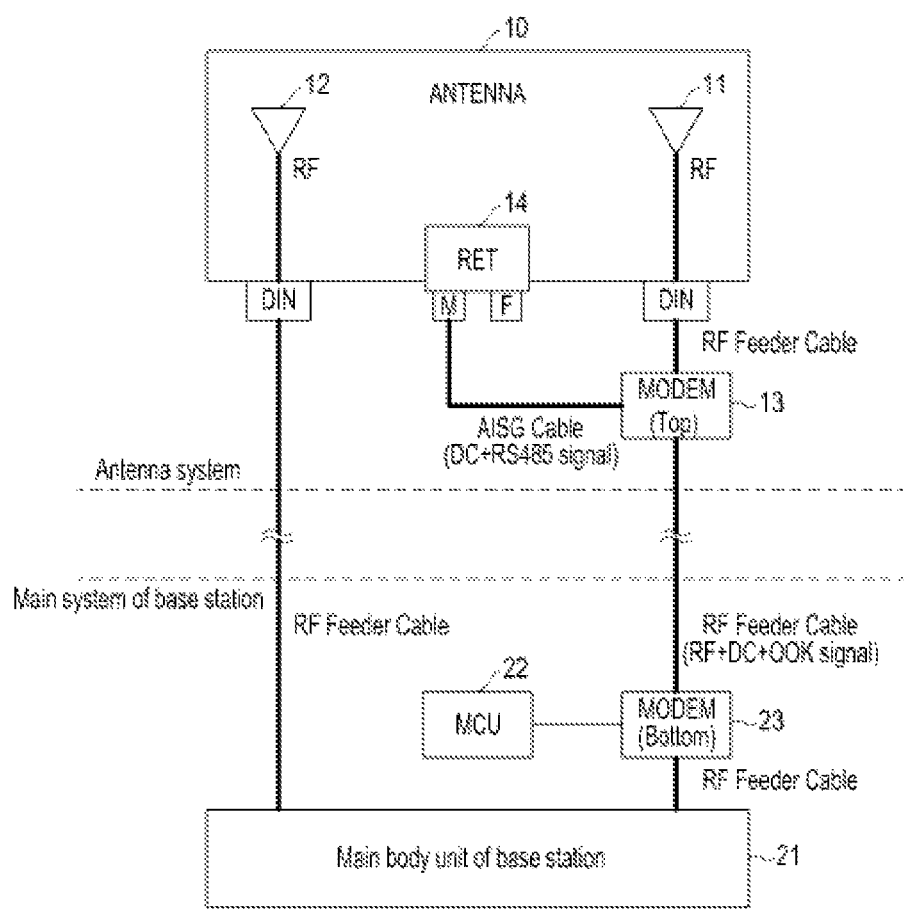
FIG. 1 is a block diagram illustrating an example of a main system of a base station and an antenna system for RET control of an antenna in the mobile communication base station according to the related art.

Hereinafter, exemplary embodiments of the present invention will be described in detail with reference to the accompanying drawings. In the following description, identical elements are provided with an identical reference numeral where possible.

Figure 2:
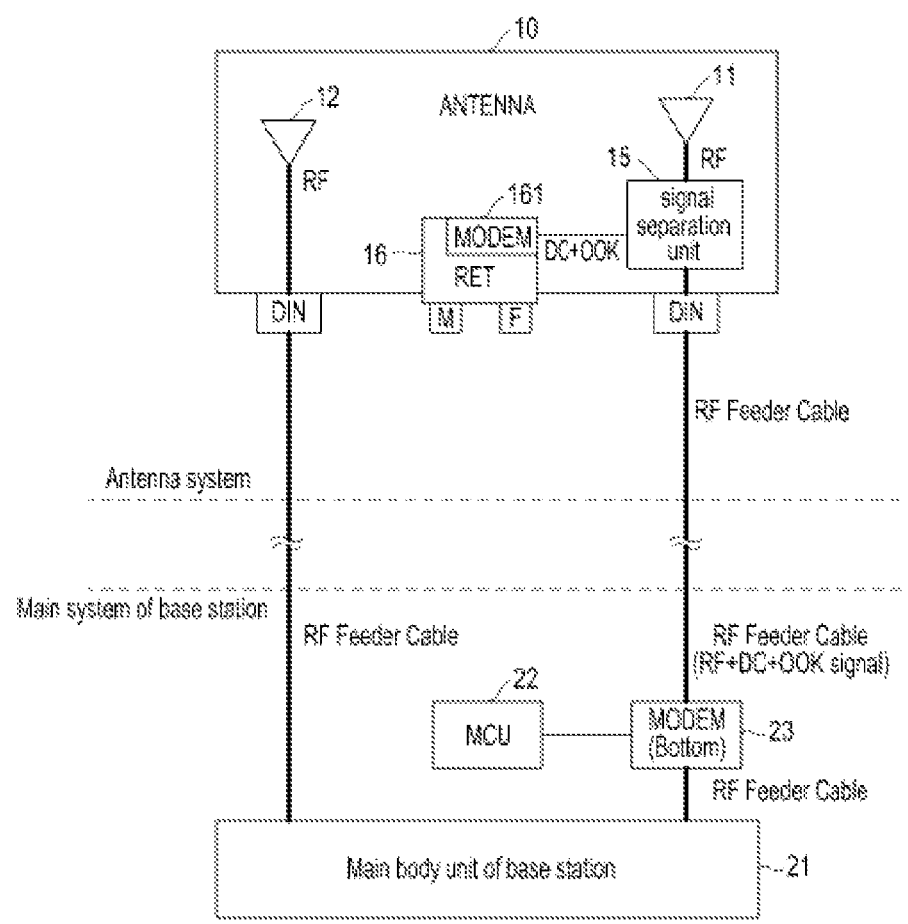
FIG. 2 is a block diagram schematically illustrating a main system of a base station and an antenna system for RET control of an antenna in a mobile communication base station according to an embodiment of the present invention.

FIG. 2 is a block diagram schematically illustrating a main system of a base station and an antenna system for RET control of an antenna in a mobile communication base station according to an embodiment of the present invention. Referring to FIG. 2, similarly to the mobile communication base station according to the related art, the mobile communication base station according to the embodiment of the present invention may be largely divided into the main system of the base station and the antenna system. The main system of the base station includes a Master Control Unit (MCU) 22 and a bottom ALD modem 23 that perform operations corresponding to a primary station according to 3GPP or AISG protocol, and the antenna system includes an RET device 16 and a signal separation unit 15 according to a feature of the present invention that perform operations corresponding to a secondary station. The antenna system and the main system of the base station are connected through a feeder cable.

A main body unit 21 of the base station, likewise to that of the mobile communication base station according to the related art, performs basic processing operations for RF signals to be transmitted and received, and transmits RF signal through the feeder cable. The MCU 22 transmits a DC signal corresponding to operating power for driving the RET device 16 and an RS485 communication signal for control. The signals transmitted by the main body unit 21 of the base station and the MCU 22 are converted and synthesized into DC signal+RF signal+OOK signal (a control signal with a preset format for antenna control) by the bottom ALD modem 23 included in the main system of the base station. That is, the bottom ALD modem 23 converts the RS485 communication signal provided by the MCU 22 into the OOK signal set in advance as a format that can be transmitted through the feeder cable, and synthesizes the converted OOK signal and the RF signal transmitted by the main body unit 21 of the base station.

The signal transmitted by the main system of the base station is provided to the antenna system through the feeder cable, in which the feeder cable is configured to be directly connected to a connector (a Deutsch Industrial Norms (DIN) connector) formed in a lower cap of a radome of an antenna 10 according to a feature of the present invention without the conventional top ALD modem (reference numeral 13 of FIG. 1). That is, the top ALD modem (reference numeral 13 of FIG. 1) separately attached to an outside of the conventional antenna 10 is not included in the present invention.

The signal separation unit 15 is provided within the radome of the antenna 10. The signal separation unit 15 may have a bias-T structure simply configured with a capacitor C and an inductor L in order to separate the RF signal from the DC signal (and the OOK signal combined with the DC signal), and may be implemented in the form of a Printed Circuit Board (PCB) on which related components and circuit patterns are printed. Within the antenna 10, the signal separation unit 15 having such a structure receives the RF signal+DC signal+OOK signal which is input to the DIN connector through the feeder cable, filters out DC signal+OOK signal, and provides the filtered signal to the RET device 16 and the RF signal to a first antenna 11 configured with a plurality of radiating elements for transmission and reception. Meanwhile, the antenna 10 may include a plurality of antennas, for example the first antenna 11 and a second antenna 12, configured with a plurality of transmission and reception radiating elements, and in the present invention, the control signal for controlling the RET device 16 may be provided through a feeder cable of one antenna, for example, the first antenna 11.

The RET device 16, likewise to that of the mobile communication base station according to the related art, has basic configurations for RET control and receives the DC signal+OOK signal provided by the signal separation unit 15 to use the DC signal as operating power according to a feature of the present invention. Furthermore, the RET device 16 includes a modem 161 converting the OOK signal into a format set in advance to be internally recognized, for example, an RS485 signal and a Transistor-Transistor Logic (TTL) signal. Accordingly, the RET device 16 receives an RET control command through the internally provided modem 161, and performs RET control operations related to the received RET control command. In this case, the RET device 16 and the signal separation unit 15 may be connected through a general coaxial cable.

According to the above-described configurations, the RET device 16 and the signal separation unit 15 according to the present invention are mounted within the radome forming an external appearance of the antenna 10 and connected through the general coaxial cable (much cheaper than the feeder cable) so that, as compared with the structure in which the conventional top ALD modem (reference numeral 13 of FIG. 1) is provided, the number of necessary feeder cables can be reduced, and the AISG cable connecting the top ALD modem (reference numeral 13 of FIG. 1) and the RET device 14 is not required. Furthermore, separate production costs for the top ALD modem (reference numeral 13 of FIG. 1) or installation costs required for mounting the top ALD modem on the outside of the antenna 10 can be reduced.

Although the RET device 16 has been exemplified as the device for receiving the control signal transmitted from the main system of the base station while being mounted to the antenna 10 and performing the operations according to the corresponding control signal, an RAS device and an RAB device may also be mounted to the antenna 10 to operate in the same manner. Furthermore, when all of the RET device, the RAS device, and the RAB device are mounted to the antenna 10, they may be connected with each other in the daisy chain manner using the AISG cable.

Figure 3:
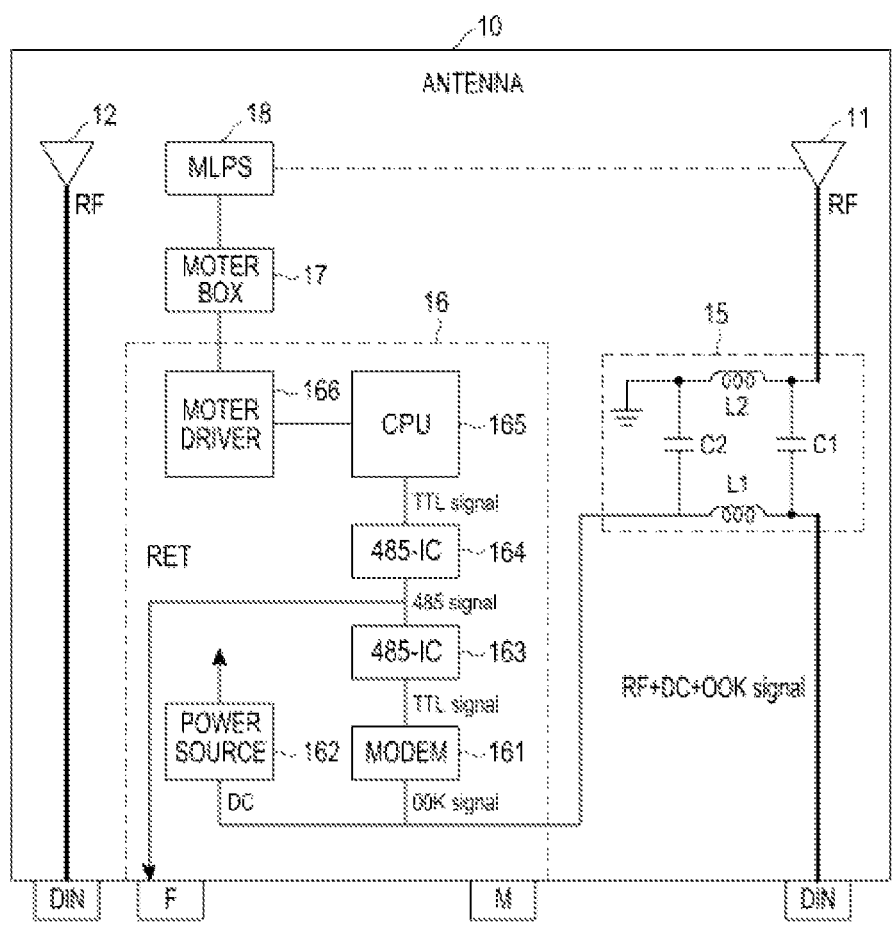
FIG. 3 illustrates detailed configurations of major parts in the antenna of FIG. 2.

FIG. 3 illustrates detailed configurations of major parts in the antenna of FIG. 2. Detailed configurations of the signal separation unit 15 and the RET device 16 are illustrated in FIG. 3. Referring to FIG. 3, the signal separation unit 15 has a bias-T structure simply configured with a capacitor C and an inductor L, in which only the RF signal is substantially separated through a first capacitor C1 to be provided to the first antenna 11, and the DC signal+OOK signal is substantially separated through a first inductor L1 to be provided to the RET device 16.

The RET device 16 includes a power source 162 that receives the DC signal+OOK signal provided from the signal separation unit 15 and provides the DC signal as operating power for internal function units, and a modem 161 that converts the OOK signal into a TTL signal as described above with reference to FIG. 2. The power source 162 may receive, for example, DC voltage of 10 V to 30 V. The power source 162 may include three power ICs and convert the DC voltage to, for example, 12 V, 5 V, and 3.3 V using the three power ICs to provide the converted voltage to the function unit requiring the corresponding voltage.

The TTL signal output from the modem 161 is provided to a first RS485 circuit 163, and the first RS485 circuit 163 converts the TTL signal into an RS485 signal to provide the converted RS485 signal to a second RS485 circuit 164. The second RS485 circuit 164 converts again the RS485 signal into a TTL signal which a Central Processing Unit (CPU) may receive, and provides the converted TTL signal to the CPU 165. Therefore, the CPU 165 receives a control command and outputs an operating control signal to a motor driver 166 in order to drive a motor 17 and a Multi Line Phase Shifter (MLPS) 18 which are electrical and mechanical devices for RET control, and the motor driver 166 accordingly drives the motor 17.

For other devices subject to remote control, such as the RAS device and the RAB device or another RET device, which are connected, for example, in the daisy chain form, the first RS485 circuit 163 converts the TTL signal provided from the modem 161 into the RS485 signal, and the second RS485 circuit 164 converts the RS485 signal into the TTL signal again, in which the RS485 signal converted by the first RS485 circuit 163 is distributed to the AISG connector as well as the second RS485 circuit 164, and this helps the RS485 signal to be provided to the outside. Accordingly, when the RAS device and the RAB device or the other RET device is connected in the daisy chain form, the RAS device and the RAB device or the other RET device may receive the RS485 signal which is output from the RET device 16 to the outside as described above.

Meanwhile, the MLPS 18 adjusts phases of the radiating elements of the first antenna 11 (and/or the second antenna 12) such that a phase difference set in advance is generated therebetween, thereby controlling the entire down tilt angle of the antenna. Although the MLPS 18 is actually provided as a path of the signal provided from the signal separation unit 15 to the radiating elements of the first antenna 11 (and/or the second antenna 12), for convenience of description, the location of the MLPS 18 is schematically illustrated in FIG. 3.

The configurations and the operations of the antenna system of the mobile communication base station according to the embodiment of the present invention may be made as described above, and although the specific embodiment of the present invention has been described above, various modifications can be made without departing from the scope of the present invention.

Although the RET device 16 has been exemplified as the device for receiving the control signal transmitted from the main system of the base station while being mounted to the antenna 10 and performing the operations according to the corresponding control signal, the RAS device and the RAB device may also be mounted to the antenna 10 to operate in the same manner. Furthermore, in addition to them, various devices may be provided in the same manner.

The invention claimed is:

1. An antenna system of a mobile communication base station comprising;
   a signal separation unit that is provided within a radome of an antenna, receives a synthetic signal of an RF signal, a DC signal, and a control signal with a preset format for antenna control which is transmitted from a main system of the base station through a feeder cable, separates the DC signal and the control signal from the RF signal, and provides the RF signal to an antenna unit; and
   a remote control target device that is provided within the radome of the antenna, receives the DC signal and the control signal which are output from the signal separation unit, uses the DC signal as operating power, and performs an operation for the antenna control according to the control signal, wherein the remote control target device includes an integrated modem to perform the remote control target device control operations that converts the control signal into a format set in advance to be internally recognized,
   wherein the remote control target device includes a Remote Electrical Tilt (RET) device for electronically controlling a down tilt angle, a Remote Azimuth Steering (RAS) device for controlling azimuth steering, and a Remote Azimuth Beamwidth (RAB) device for controlling a beamwidth of an azimuth, and
   wherein the RET device comprises;
   a power source that provides the DC signal output from the signal separation unit as operating power for each of internal function units;
   a first RS485 circuit that converts a Transistor-Transistor Logic (TTL) signal output from the integrated modem into the RS485 signal;
   a second RS485 circuit that converts the RS485 signal output from the first RS485 circuit into the TTL signal again; and
   a Central Processing Unit (CPU) that receives the TTL signal output from the second RS485 circuit to recognize a control command, and outputs an operating control signal to a driver that drives an electrical and mechanical device set in advance for the antenna control,
   wherein the integrated modem converts an On-Off Keying (OOK) signal into the TTL signal, and
   wherein the RS485 signal provided from the first RS485 circuit to the second RS485 circuit is distributed and output to the RAS device and the RAB device.

2. The antenna system of claim 1, wherein the control signal output from the signal separation unit has an On-Off Keying (OOK) signal format, and the remote control target device converts the OOK signal format into an RS485 signal and a Transistor-Transistor Logic (TTL) signal.

3. The antenna system of claim 1, wherein the signal separation unit 15 has a bias-T structure configured with a capacitor C and an inductor L, and is implemented in the form of a Printed Circuit Board (PCB) on which related components and circuit patterns are printed.

* * * * *